United States Patent
Vidyadhara et al.

(10) Patent No.: US 11,182,171 B1
(45) Date of Patent: Nov. 23, 2021

(54) SYSTEMS AND METHODS FOR SECURELY LAUNCHING AN EMBEDDED OPERATING SYSTEM USING NON-VOLATILE MEMORY NAMESPACE IDENTIFIER MAPPING

(71) Applicant: Dell Products L.P., Round Rock, TX (US)

(72) Inventors: Sumanth Vidyadhara, Bangalore (IN); Lip Vui Kan, Hillbrooks (SG); Neeraj Kumar Pant, Almora (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/064,044

(22) Filed: Oct. 6, 2020

(51) Int. Cl.
*G06F 9/44* (2018.01)
*G06F 9/4401* (2018.01)
*G06F 12/02* (2006.01)
*G06F 9/445* (2018.01)

(52) U.S. Cl.
CPC .......... *G06F 9/4406* (2013.01); *G06F 9/4411* (2013.01); *G06F 9/44505* (2013.01); *G06F 12/0292* (2013.01)

(58) Field of Classification Search
CPC ................. G06F 1/32; G06F 1/22; G06F 1/28
See application file for complete search history.

(56) References Cited

U.S. PATENT DOCUMENTS

| | | | | |
|---|---|---|---|---|
| 2002/0157027 | A1* | 10/2002 | Dayan ................... | G06F 21/575 726/2 |
| 2010/0153696 | A1* | 6/2010 | Beachem ............ | H04L 43/0817 713/2 |
| 2014/0068235 | A1* | 3/2014 | Nightingale ........ | G06F 9/44573 713/1 |
| 2016/0117115 | A1* | 4/2016 | Mehra ................... | G06F 3/0631 711/112 |

* cited by examiner

*Primary Examiner* — Keshab R Pandey
(74) *Attorney, Agent, or Firm* — Jackson Walker L.L.P.

(57) ABSTRACT

A preboot module of BIOS may be configured to create a partition mapping table for namespace identifiers of sub-partitions of a boot partition, determine a configuration policy for the information handling system, store the configuration policy in a partition of non-volatile memory, launch execution of an embedded operating system kernel, and communicate the partition mapping table to the embedded operating system kernel based on the configuration policy, such that the embedded operating system kernel is enabled to load the configuration policy from the non-volatile memory and load and execute one or more applications based on the partition mapping table and the configuration policy.

15 Claims, 2 Drawing Sheets

SYSTEMS AND METHODS FOR SECURELY LAUNCHING AN EMBEDDED OPERATING SYSTEM USING NON-VOLATILE MEMORY NAMESPACE IDENTIFIER MAPPING

TECHNICAL FIELD

The present disclosure relates in general to information handling systems, and more specifically to launching an embedded operating system using non-volatile memory namespace identifier mapping.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most operating systems available today, in particular operating system recovery images, do not cater to all the possible functionalities of a platform-specific behavior. For example, in a bare metal operating system recovery, preboot Unified Extensible Firmware Interface (UEFI) Basic Input/output system (BIOS) Connect may enable recovery. However, in an enterprise network, various protocols for enterprise bare metal operating system recovery may be needed. Supporting all of such possible network protocols may require more complication than preboot firmware such as a BIOS is capable of handling.

Existing approaches may also have challenges relating to serviceability, such as advanced hardware diagnosis, which may require execution on a particular operating system using a particular diagnostic application. Such approaches may be time consuming and laborious, and require licensing of such special diagnostic application.

Existing approaches also have disadvantages in implementing bare metal operating system firmware updates and operating system driver updates prior to operating system boot.

SUMMARY

In accordance with the teachings of the present disclosure, the disadvantages and problems associated with operating system inability to support platform functionality may be reduced or eliminated.

In accordance with embodiments of the present disclosure, an information handling system may include a processor, and a non-volatile memory with a boot partition having stored thereon, each in a sub-partition of the boot partition, an embedded operating system kernel and one or more applications executable on the embedded operating system kernel, wherein each sub-partition is associated with a namespace identifier. The information handling system may also include a basic input/output system communicatively coupled to the processor and embodied by executable instructions embodied in non-transitory computer readable media, the instructions configured to, when executed by the processor, implement a preboot module configured to create a partition mapping table for the namespace identifiers of the sub-partitions, determine a configuration policy for the information handling system, store the configuration policy in a partition of the non-volatile memory, launch execution of the embedded operating system kernel, and communicate the partition mapping table to the embedded operating system kernel based on the configuration policy. The embedded operating system kernel may enabled to load the configuration policy from the non-volatile memory and load and execute the one or more applications based on the partition mapping table and the configuration policy.

In accordance with these and other embodiments of the present disclosure, a method may be provided for use in a basic input/output system of an information handling system comprising a non-volatile memory and a boot partition having stored thereon, each in a sub-partition of the boot partition, an embedded operating system kernel and one or more applications executable on the embedded operating system kernel, wherein each sub-partition is associated with a namespace identifier. The preboot module may be configured to create a partition mapping table for the namespace identifiers of the sub-partitions, determine a configuration policy for the information handling system, store the configuration policy in a partition of the non-volatile memory, launch execution of the embedded operating system kernel, and communicate the partition mapping table to the embedded operating system kernel based on the configuration policy. The embedded operating system kernel may enabled to load the configuration policy from the non-volatile memory and load and execute the one or more applications based on the partition mapping table and the configuration policy.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a basic input/output system of an information handling system, implement a preboot module. The preboot module may be configured to create a partition mapping table for namespace identifiers of sub-partitions, determine a configuration policy for the information handling system, store the configuration policy in a partition of non-volatile memory, launch execution of an embedded operating system kernel, and communicate the partition mapping table to the embedded operating system kernel based on the configuration policy, such that the embedded operating system kernel is enabled to load the configuration policy from the non-volatile memory and load and execute one or more applications based on the partition mapping table and the configuration policy.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
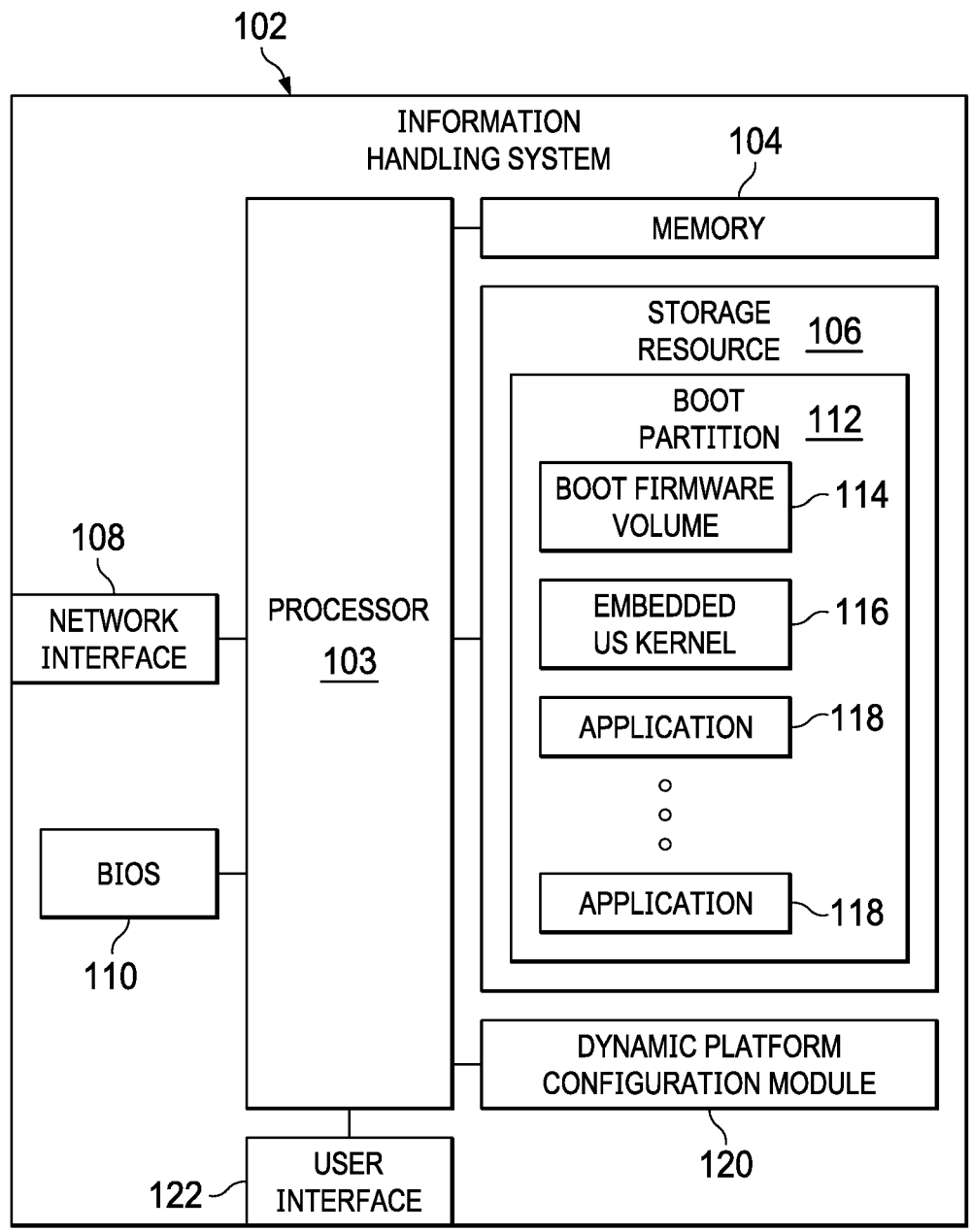
FIG. 1 illustrates a block diagram of an example information handling system, in accordance with certain embodiments of the present disclosure.
Figure 2:
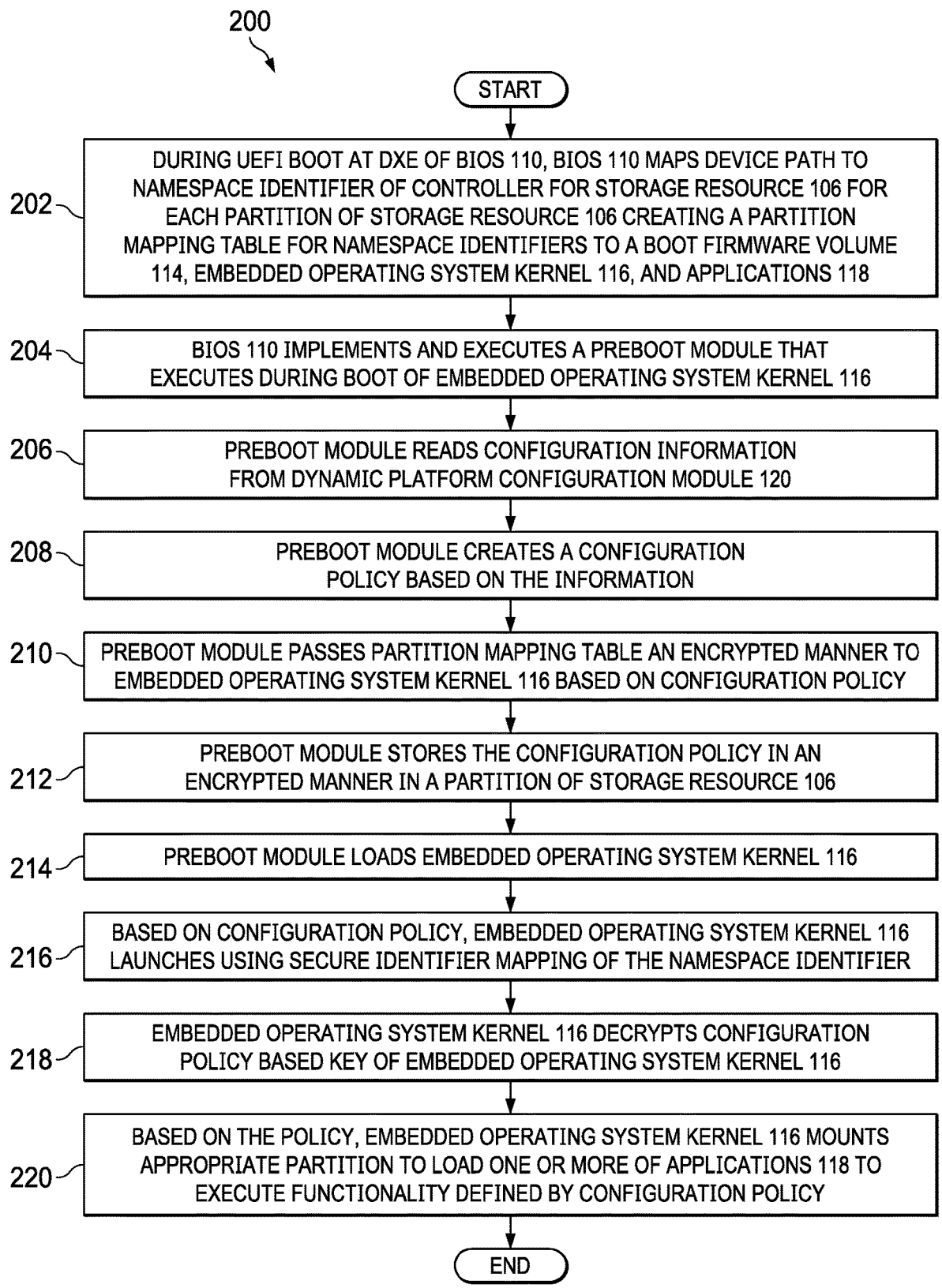
FIG. 2 illustrates a flow chart of an example method for securely and dynamically launching an embedded operating system using non-volatile memory namespace identifier mapping, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 122 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102.

In particular embodiments, storage resource 106 may comprise a non-volatile memory implemented in accordance with the Non-Volatile Memory Express (NVMe) standard. As shown in FIG. 1, storage resource 106 may include a boot partition 112 comprising boot firmware volume 114, embedded OS kernel 116, and one or more applications 118. Each of boot firmware volume 114, embedded OS kernel 116, and one or more applications 118 may be stored in storage resource 106 in a subpartition of boot partition 112 with a namespace identifier corresponding to such subpartition.

Boot firmware volume 114 may comprise any suitable program of instructions embodied as pre-operating system firmware to be executed in connection with boot of information handling system 102.

Embedded OS kernel 116 may comprise any program of executable instructions, or aggregation of programs of executable instructions, configured to manage and/or control the allocation and usage of hardware resources such as memory, processor time, disk space, and input and output devices, and provide an interface between such hardware resources and applications 118 hosted by embedded OS kernel 116. Active portions of embedded OS kernel 116 may be transferred from storage resource 106 to memory 104 for execution by processor 103.

Applications 118 may comprise any program of executable instructions, or aggregation of programs of executable instructions, configured to execute within embedded OS kernel 116 in order to perform a particular task or functionality.

As shown in FIG. 1, storage resource 106 may include a boot partition 112 and a dynamic platform configuration module 120 stored in a non-boot partition of storage resource 106, and may be encrypted. Dynamic platform configuration module 120 may include an execute program or instructions and/or collection of data that may organize, manage, and/or store configuration information regarding components and/or capabilities of information handling system 102, and may be embodied in computer-readable media accessible to processor 103.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

User interface 122 may comprise any instrumentality or aggregation of instrumentalities by which a user may interact with information handling system 102. For example, user interface 122 may permit a user to input data and/or instructions into information handling system 102 (e.g., via a keyboard, pointing device, and/or other suitable component), and/or otherwise manipulate information handling system 102 and its associated components. User interface 122 may also permit information handling system 102 to communicate data to a user, e.g., by way of a display device.

In operation, during UEFI boot at a driver execution environment (DXE) of BIOS 110, BIOS 110 may map a device path to the namespace identifier of a controller for storage resource 106 for each partition of storage resource 106 (e.g., including boot partition 112), creating a partition mapping table for namespace identifiers to a boot firmware volume 114, embedded OS kernel 116, and applications 118.

Further, BIOS 110 may implement and execute a preboot module that, during boot of embedded OS kernel 116, reads configuration information from dynamic platform configuration module 120, creates a configuration policy based on the information, passes the partition mapping table in an encrypted manner to embedded OS kernel 116 based on the configuration policy, and stores the configuration policy in an encrypted manner in a partition of storage resource 106. Further, such preboot module may also load embedded OS kernel 116.

Based on the configuration policy, embedded OS kernel 116 may be launched using a secure identifier mapping of the namespace identifier and may decrypt the configuration policy based a key of embedded OS kernel 116. Based on the policy, embedded OS kernel 116 may mount an appropriate partition to load one or more of applications 118 to execute functionality defined by the configuration policy.

FIG. 2 illustrates a flow chart of an example method 200 for securely and dynamically launching an embedded operating system using non-volatile memory namespace identifier mapping. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during UEFI boot at DXE of BIOS 110, BIOS 110 may map a device path to the namespace identifier of a controller for storage resource 106 for each partition of storage resource 106 (e.g., including boot partition 112), creating a partition mapping table for namespace identifiers to a boot firmware volume 114, embedded OS kernel 116, and applications 118. At step 204, BIOS 110 may implement and execute a preboot module that executes during boot of embedded OS kernel 116. At step 206, the preboot module may read configuration information from dynamic platform configuration module 120. At step 208, the preboot module may create a configuration policy based on the information.

At step 210, the preboot module may pass the partition mapping table in an encrypted manner to embedded OS kernel 116 based on the configuration policy. At step 212, the preboot module may store the configuration policy in an encrypted manner in a partition of storage resource 106. At step 214, the preboot module may load embedded OS kernel 116.

At step 216, based on the configuration policy, embedded OS kernel 116 may be launched using a secure identifier mapping of the namespace identifier and execute as a post-operating system module. At step 218, embedded OS kernel 116 may decrypt the configuration policy based on a key of embedded OS kernel 116. At step 220, based on the policy, embedded OS kernel 116 may mount an appropriate partition to load one or more of applications 118 to execute functionality defined by the configuration policy. After completion of step 220, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    a non-volatile memory;
    a boot partition having stored thereon, each in a sub-partition of the boot partition, an embedded operating system kernel and one or more applications executable on the embedded operating system kernel, wherein each sub-partition is associated with a namespace identifier; and
    a basic input/output system communicatively coupled to the processor and embodied by executable instructions embodied in non-transitory computer readable media, the instructions configured to, when executed by the processor, implement a preboot module configured to:
        create a partition mapping table for the namespace identifiers of the sub-partitions;
        determine a configuration policy for the information handling system;
        store the configuration policy in a partition of the non-volatile memory;
        launch execution of the embedded operating system kernel; and
        communicate the partition mapping table to the embedded operating system kernel based on the configuration policy;
        such that the embedded operating system kernel is enabled to load the configuration policy from the non-volatile memory and load and execute the one or more applications based on the partition mapping table and the configuration policy.

2. The information handling system of claim 1, wherein the non-volatile memory is implemented in accordance with the Non-Volatile Memory Express standard.

3. The information handling system of claim 1, wherein the basic input/output system is configured to:
    load configuration information from a dynamic platform configuration module; and
    generate the configuration policy based on the configuration information.

4. The information handling system of claim 1, wherein the preboot module executes during a driver execution environment of the basic input/output system.

5. The information handling system of claim 1, wherein the basic input/output system comprises a Unified Extensible Firmware Interface.

6. A method comprising, in a basic input/output system of an information handling system comprising a non-volatile memory and a boot partition, having stored thereon, each in a sub-partition of the boot partition, an embedded operating system kernel and one or more applications executable on the embedded operating system kernel, wherein each sub-partition is associated with a namespace identifier, implementing a preboot module configured to:
- create a partition mapping table for the namespace identifiers of the sub-partitions;
- determine a configuration policy for the information handling system;
- store the configuration policy in a partition of the non-volatile memory;
- launch execution of the embedded operating system kernel; and
- communicate the partition mapping table to the embedded operating system kernel based on the configuration policy;
- such that the embedded operating system kernel is enabled to load the configuration policy from the non-volatile memory and load and execute the one or more applications based on the partition mapping table and the configuration policy.

7. The method of claim 6, wherein the non-volatile memory is implemented in accordance with the Non-Volatile Memory Express standard.

8. The method of claim 6, wherein the basic input/output system is configured to:
- load configuration information from a dynamic platform configuration module; and
- generate the configuration policy based on the configuration information.

9. The method of claim 6, wherein the preboot module executes during a driver execution environment of the basic input/output system.

10. The method of claim 6, wherein the basic input/output system comprises a Unified Extensible Firmware Interface.

11. An article of manufacture comprising:
a computer readable medium; and
computer-executable instructions carried on the computer readable medium, the instructions readable by a processor, the instructions, when read and executed, for causing the processor to, in a basic input/output system of an information handling system, implement a preboot module configured to:
- create a partition mapping table for namespace identifiers of sub-partitions;
- determine a configuration policy for the information handling system;
- store the configuration policy in a partition of non-volatile memory;
- launch execution of an embedded operating system kernel; and
- communicate the partition mapping table to the embedded operating system kernel based on the configuration policy;
- such that the embedded operating system kernel is enabled to load the configuration policy from the non-volatile memory and load and execute one or more applications based on the partition mapping table and the configuration policy.

12. The article of claim 11, wherein the non-volatile memory is implemented in accordance with the Non-Volatile Memory Express standard.

13. The article of claim 11, wherein the basic input/output system is configured to:
- load configuration information from a dynamic platform configuration module; and
- generate the configuration policy based on the configuration information.

14. The article of claim 11, wherein the preboot module executes during a driver execution environment of the basic input/output system.

15. The article of claim 11, wherein the basic input/output system comprises a Unified Extensible Firmware Interface.

* * * * *